(12) United States Patent
Battey et al.

(10) Patent No.: US 9,458,905 B2
(45) Date of Patent: Oct. 4, 2016

(54) SPRING ASSEMBLY AND METHOD

(71) Applicant: Steelcase Inc., Grand Rapids, MI (US)

(72) Inventors: Robert J. Battey, Middleville, MI (US); Todd T. Andres, Sparta, MI (US); Gary Lee Karsten, Wyoming, MI (US); David Allen Bodnar, Muskegon, MI (US)

(73) Assignee: Steelcase Inc., Grand Rapids, MI (US)

( * ) Notice: Subject to any disclaimer, the term of this patent is extended or adjusted under 35 U.S.C. 154(b) by 155 days.

(21) Appl. No.: 14/029,285

(22) Filed: Sep. 17, 2013

(65) Prior Publication Data

US 2014/0077429 A1  Mar. 20, 2014

Related U.S. Application Data

(60) Provisional application No. 61/703,677, filed on Sep. 20, 2012, provisional application No. 61/703,515, filed on Sep. 20, 2012, provisional application No. 61/703,663, filed on Sep. 20, 2012, provisional application No. 61/703,659, filed on Sep. 20, 2012, provisional application No. 61/703,661, filed on Sep. 20, 2012, provisional application No. 61/703,667, filed on Sep. 20, 2012, provisional application No. 61/703,666, filed on Sep. 20, 2013, provisional application No. 61/754,803, filed on Jan. 21, 2013.

(51) Int. Cl.
*F16F 1/04* (2006.01)
*F16F 1/12* (2006.01)
*A47C 1/03* (2006.01)
*A47C 31/02* (2006.01)
*A47C 7/18* (2006.01)
*A47C 1/032* (2006.01)
*A47C 7/54* (2006.01)
*A47C 17/18* (2006.01)

(52) U.S. Cl.
CPC ............ *F16F 1/041* (2013.01); *A47C 1/03* (2013.01); *A47C 1/03255* (2013.01); *A47C 7/18* (2013.01); *A47C 7/543* (2013.01); *A47C 17/18* (2013.01); *A47C 31/023* (2013.01); *F16F 1/121* (2013.01); *Y10T 29/49613* (2015.01)

(58) Field of Classification Search
CPC ............... B60G 2204/12; B60G 2204/124; B60G 2204/1242; F16F 7/00; F16F 7/09; F16F 1/12; F16F 1/121; F16F 1/04; F16F 1/041; A47C 1/03
See application file for complete search history.

(56) References Cited

U.S. PATENT DOCUMENTS 2,329,673 A  9/1943  Wood
2,651,488 A  9/1953  Sauer
(Continued)

FOREIGN PATENT DOCUMENTS

EP  0063860 A2  3/1982
EP  0456142 A1  11/1991
(Continued)

OTHER PUBLICATIONS

International Search Report, PCT/US2013/060621, Apr. 16, 2014, 10 pages.

*Primary Examiner* — Vishal Sahni
(74) *Attorney, Agent, or Firm* — Price Heneveld LLP

(57) ABSTRACT

A method of assembling a spring inside of a tube includes providing a coil spring and a tube having a first retaining structure at a first end of the tube. The method includes positioning a rod in the tube. The spring is positioned in the tube, and a second retaining structure is attached to the rod with the spring positioned between the first and second retaining structures. A force is applied to the spring, and the second retaining structure is fixed at a position wherein the spring provides a desired preload.

9 Claims, 9 Drawing Sheets

(56) References Cited

U.S. PATENT DOCUMENTS

| | | | |
|---|---|---|---|
| 2,707,230 A | 4/1955 | Beltman et al. | |
| 2,714,759 A | 8/1955 | Von Wangenheim | |
| 2,905,458 A | 9/1959 | Mason | |
| 3,066,581 A | 12/1962 | Goldbeck | |
| 3,120,311 A * | 2/1964 | Metzger | 213/20 |
| 3,271,071 A | 9/1966 | Tabor | |
| 3,307,883 A | 3/1967 | Wustenhagen | |
| 3,417,956 A | 12/1968 | Helms | |
| 3,430,647 A | 3/1969 | Suchowolec | |
| 3,455,601 A | 7/1969 | Lie | |
| 3,561,488 A | 2/1971 | Byers | |
| 3,634,925 A | 1/1972 | Van Loo | |
| 3,656,221 A | 4/1972 | Scheublein, Jr. et al. | |
| 3,725,990 A | 4/1973 | Petersen et al. | |
| 3,881,348 A | 5/1975 | Morton | |
| 3,965,849 A | 6/1976 | Gee | |
| 4,089,512 A | 5/1978 | Allinquant et al. | |
| 4,170,382 A * | 10/1979 | Wheeler | 297/300.5 |
| 4,194,731 A | 3/1980 | Marx | |
| 4,295,627 A | 10/1981 | Graves | |
| 4,408,799 A | 10/1983 | Bowman | |
| 4,451,964 A | 6/1984 | Ludwig | |
| 4,479,505 A | 10/1984 | Kasprik et al. | |
| 4,579,386 A | 4/1986 | Rupp et al. | |
| 4,614,029 A | 9/1986 | Neumann et al. | |
| 5,052,752 A | 10/1991 | Robinson | |
| 5,067,391 A | 11/1991 | Choinski et al. | |
| 5,108,149 A | 4/1992 | Ambasz | |
| 5,218,763 A | 6/1993 | Market et al. | |
| 5,947,459 A * | 9/1999 | Ducloux | B60G 15/063 267/221 |
| 6,257,666 B1 | 7/2001 | Struppler | |
| 6,499,267 B1 * | 12/2002 | Ayrle | 52/698 |
| 6,959,797 B2 | 11/2005 | Mintgen et al. | |
| 6,976,289 B1 * | 12/2005 | Luca | 16/76 |
| 7,594,700 B2 | 9/2009 | Stumpf et al. | |
| 7,806,478 B1 | 10/2010 | Cvek | |
| 7,992,937 B2 | 8/2011 | Plikat et al. | |
| 2004/0159515 A1 * | 8/2004 | Bell | B60G 15/063 188/315 |
| 2006/0220431 A1 | 10/2006 | Kwa | |
| 2008/0156602 A1 * | 7/2008 | Hiemenz et al. | 188/267.1 |
| 2011/0278778 A1 * | 11/2011 | Qattan | 267/151 |

FOREIGN PATENT DOCUMENTS

| | | |
|---|---|---|
| EP | 0635228 A1 | 1/1995 |
| EP | 0897053 A1 | 2/1999 |
| EP | 1393987 A1 | 3/2004 |
| EP | 1449461 A1 | 8/2004 |
| EP | 1874160 A1 | 1/2008 |
| EP | 2120648 A1 | 11/2009 |
| FR | 1039317 * | 10/1953 |
| WO | 9311890 A1 | 6/1993 |
| WO | 0228228 A2 | 4/2002 |
| WO | 2004043739 A2 | 5/2004 |
| WO | 2004093601 A2 | 11/2004 |
| WO | 2005000073 A1 | 1/2005 |
| WO | 2010137830 A2 | 12/2010 |

* cited by examiner

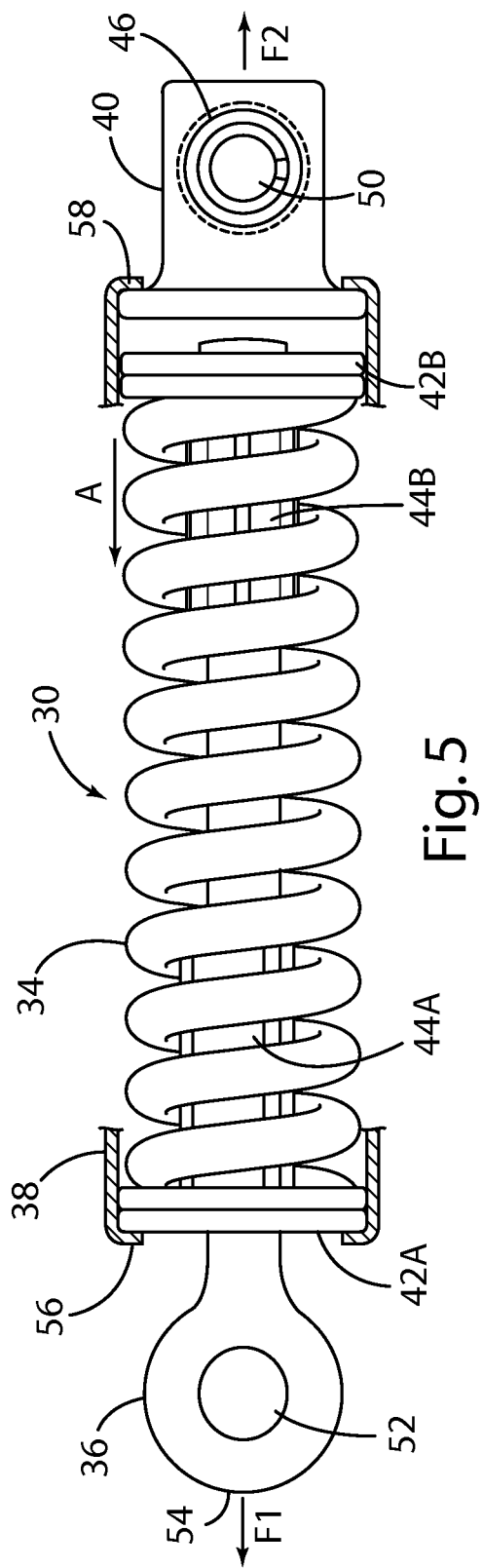
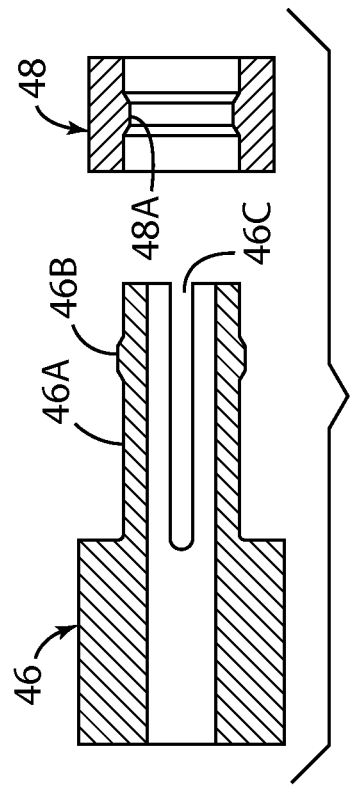
Fig. 5
Fig. 5A

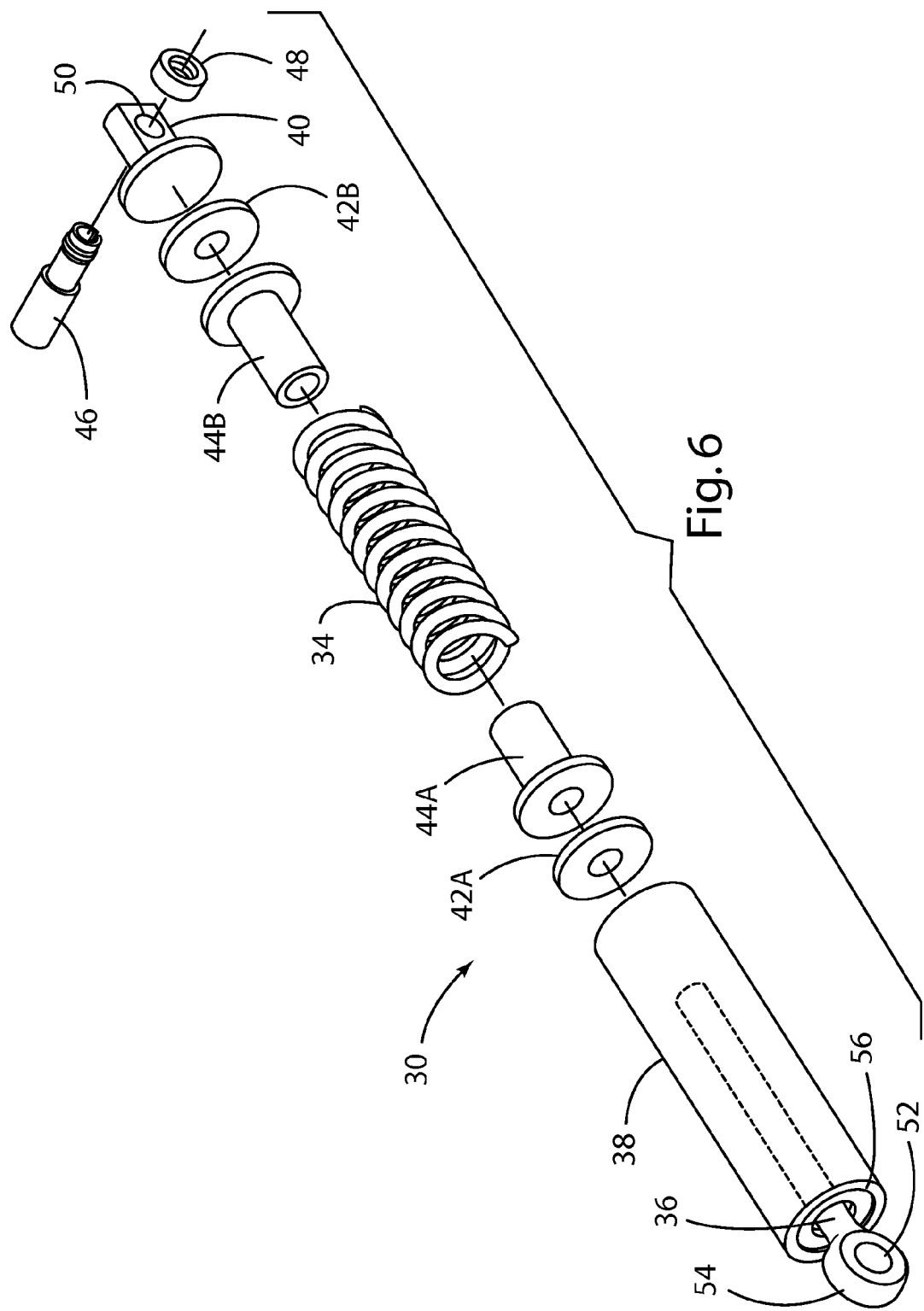

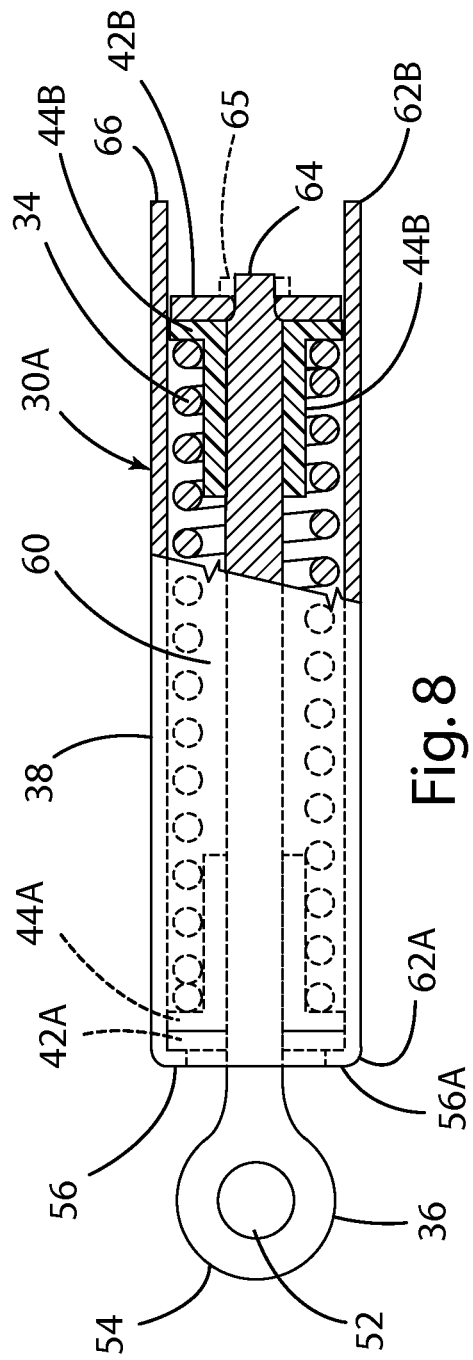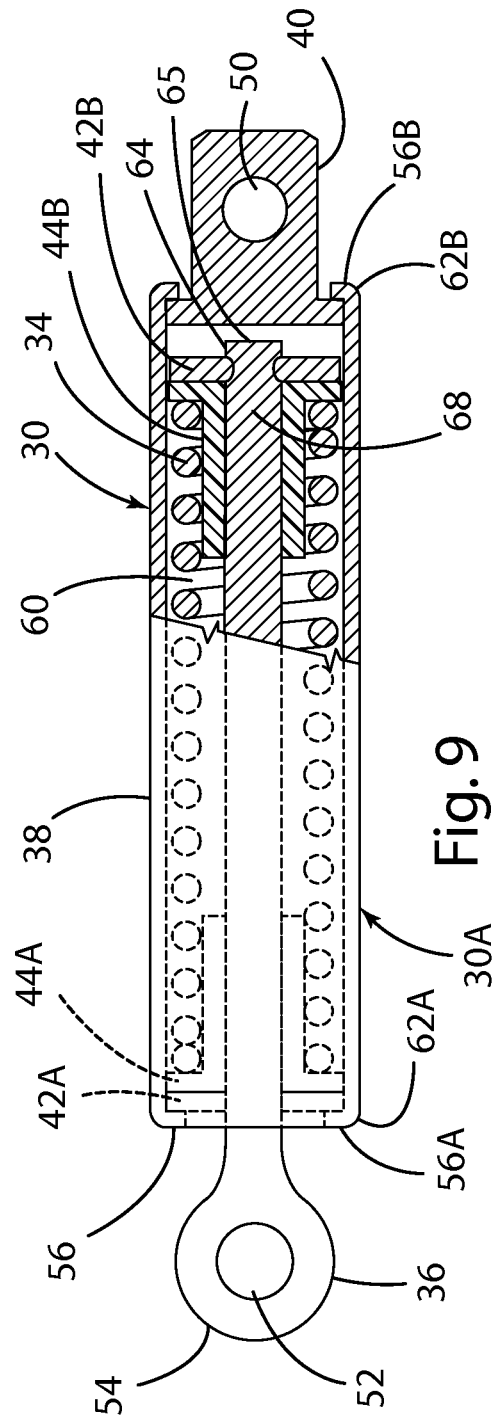

SPRING ASSEMBLY AND METHOD

CROSS-REFERENCE TO RELATED APPLICATIONS

This application claims the benefit of U.S. Provisional Application Nos. 61/703,677 filed on Sep. 20, 2012, entitled "CHAIR ASSEMBLY," 61/703,515 filed on Sep. 20, 2012, entitled "SPRING ASSEMBLY AND METHOD," 61/703,663 filed on Sep. 20, 2012, entitled "CHAIR BACK MECHANISM AND CONTROL ASSEMBLY," 61/703,659 filed on Sep. 20, 2012, entitled "CONTROL ASSEMBLY FOR CHAIR," and 61/703,661 filed on Sep. 20, 2012, entitled "CHAIR ASSEMBLY," 61/703,666, filed on Sep. 20, 2012, entitled "CHAIR ASSEMBLY WITH UPHOLSTERY COVERING," 61/703,667, filed on Sep. 20, 2012 entitled "CHAIR ARM ASSEMBLY," and 61/754,803 filed on Jan. 21, 2013, entitled "CHAIR ASSEMBLY WITH UPHOLSTERY COVERING," the entire contents of which are incorporated herein by reference.

BACKGROUND OF THE INVENTION

Various springs and spring assemblies have been developed for providing a resistance or assistance force for devices such as chair tilt mechanisms, height adjustment mechanisms for chairs and tables, door opening/closing mechanisms and other applications requiring an assistance or resistance force. Due to production tolerances and other such variables, the amount of force generated by a spring may vary from one spring to another. This can lead to inconsistent resistance forces assemblies such as office chairs, height adjustable tables, or other devices or products that utilize springs.

BRIEF SUMMARY OF THE INVENTION

One aspect of the present invention is a method of assembling a spring inside of a tube or enclosure. The method includes providing a coil spring having first and second opposite spring ends. The method also includes providing an enclosure such as a tube having an interior space and a first retaining structure at a first end of the tube, such that the spring transmits force to the tube upon insertion of the spring into the second end of the tube. The method also includes providing an elongated rod having first and second ends, and providing first and second retainers that are configured to engage the first and second opposite ends of the coil spring and transmit axial loads to the first and second opposite spring ends and compress the coil spring. The method further includes positioning the rod in the tube with the first rod end towards the first tube end and the second end towards the second tube end. The spring is positioned in the tube with the first end of the spring engaging the first retaining structure. The method further includes providing a second retaining structure, which is positioned inside the tube. The second retaining structure is attached to the second end of the rod with the spring positioned at least partially inside the tube between the first and second retaining structures. This spring is compressed utilizing a force acting on the spring. A target preload force is determined, and the magnitude of the force acting on the spring is varied or adjusted. The second retaining structure is fixed at a position wherein the spring provides a preload force meeting predefined acceptance criteria. The predefined acceptance criteria may comprise a condition wherein the magnitude of the force acting on the spring is within a predefined tolerance range of the target preload force.

Another aspect of the present invention is a method of fabricating a force-generating assembly of the type that includes a resilient member providing a predefined preload acting on an enclosure and an actuator. A dimension of the enclosure and actuator does not change unless a force acting on the enclosure and actuator exceeds a predefined preload force. The method includes providing an enclosure and an actuator. At least a portion of the actuator is positioned in the enclosure with a portion of the actuator extending outside the enclosure. A resilient member is provided, and the enclosure and the actuator are operably interconnected utilizing the resilient member. The resilient member is capable of generating a resistance force tending to return the actuator and the enclosure to the assembled positions relative to one another. The resilient member is deformed such that the resilient member generates a force falling within a predefined range. The enclosure or other component is fixed relative to the actuator such that the resilient member provides a predefined preload force.

Yet another aspect of the present invention is an energy mechanism including a coil spring and an enclosure housing the spring. The mechanism also includes an actuator that is movable between an initial position and at least one displaced position. The actuator extends out of the enclosure, and it is connected to the coil spring to transmit a spring force outside of the enclosure. The spring is supported in a preselected preloaded state within the enclosure after being preloaded to a predetermined spring force. An initial spring force required to move the actuator from the initial position correlates to the predetermined force amount.

These and other features, advantages, and objects of the present invention will be further understood and appreciated by those skilled in the art by reference to the following specification, claims, and appended drawings.

BRIEF DESCRIPTION OF THE DRAWINGS

FIG. 5 is a side elevational view of a spring assembly according to the present invention;

FIG. 5A is an exploded cross sectional view of the pin and retainer of FIG. 5;

FIG. 6 is an exploded isometric view of a spring assembly according to the present invention;

FIG. 8 is a partially fragmentary view of a spring subassembly according to the present invention;

FIG. 9 is a partially fragmentary view of a spring assembly according to the present invention.

DETAILED DESCRIPTION

Figure 1:
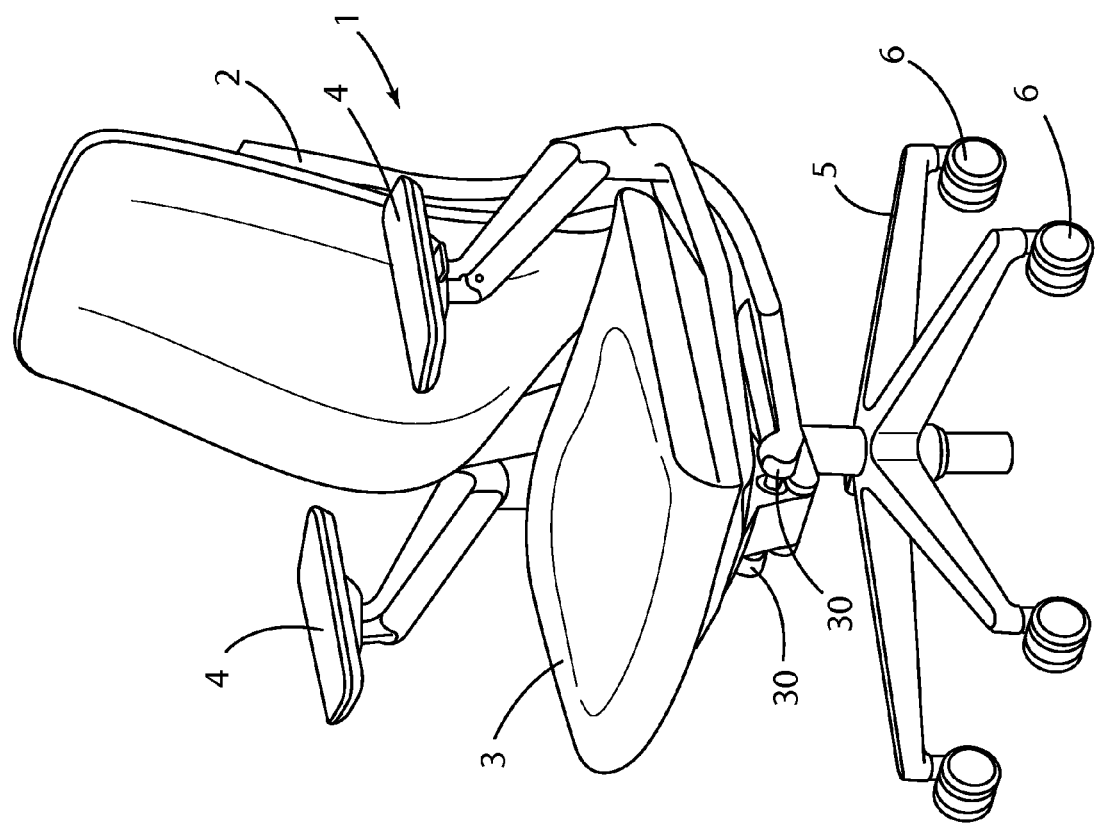
FIG. 1 is an isometric view of a chair including one or more spring assemblies according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
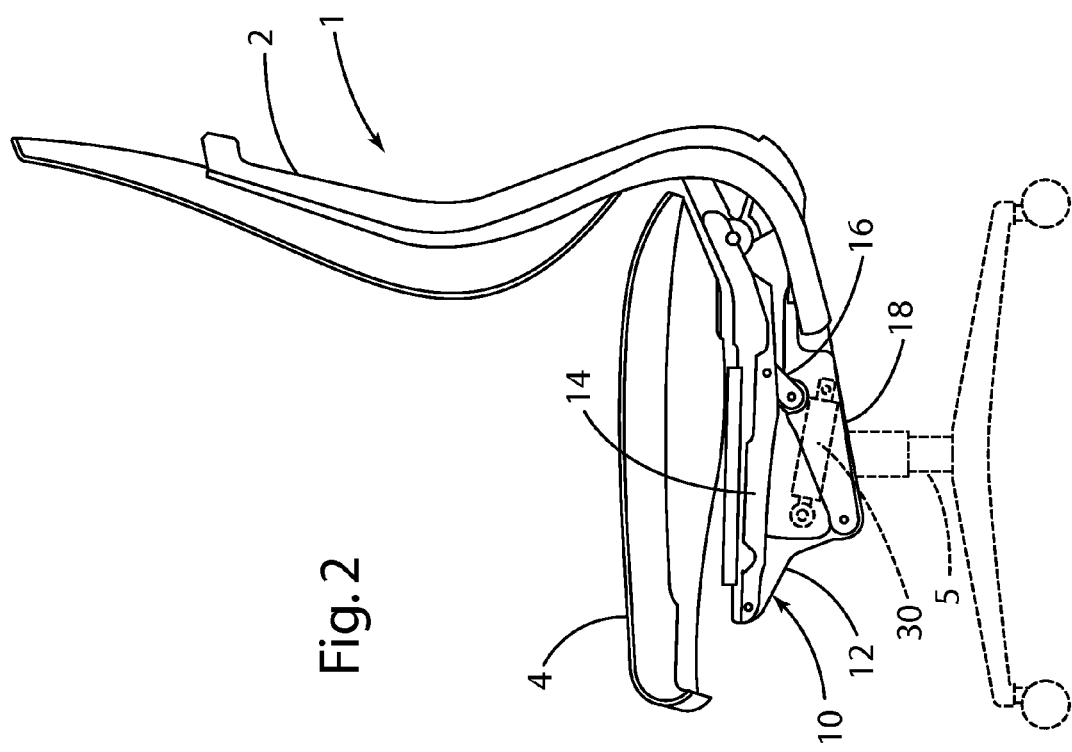
FIG. 2 is a side elevational view of the chair of FIG. 1.
Figure 3:
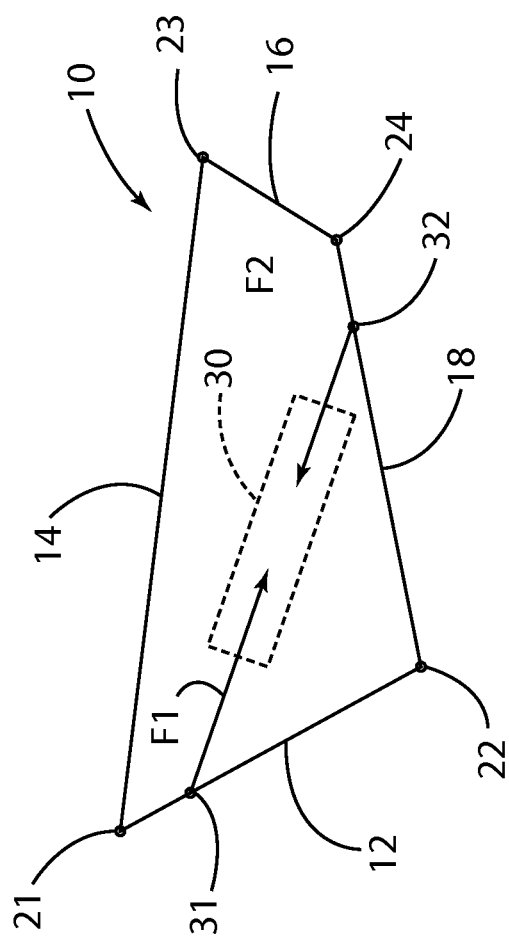
FIG. 3 is a schematic view of the linkage and springs of the chair of FIG. 1.
Figure 4:
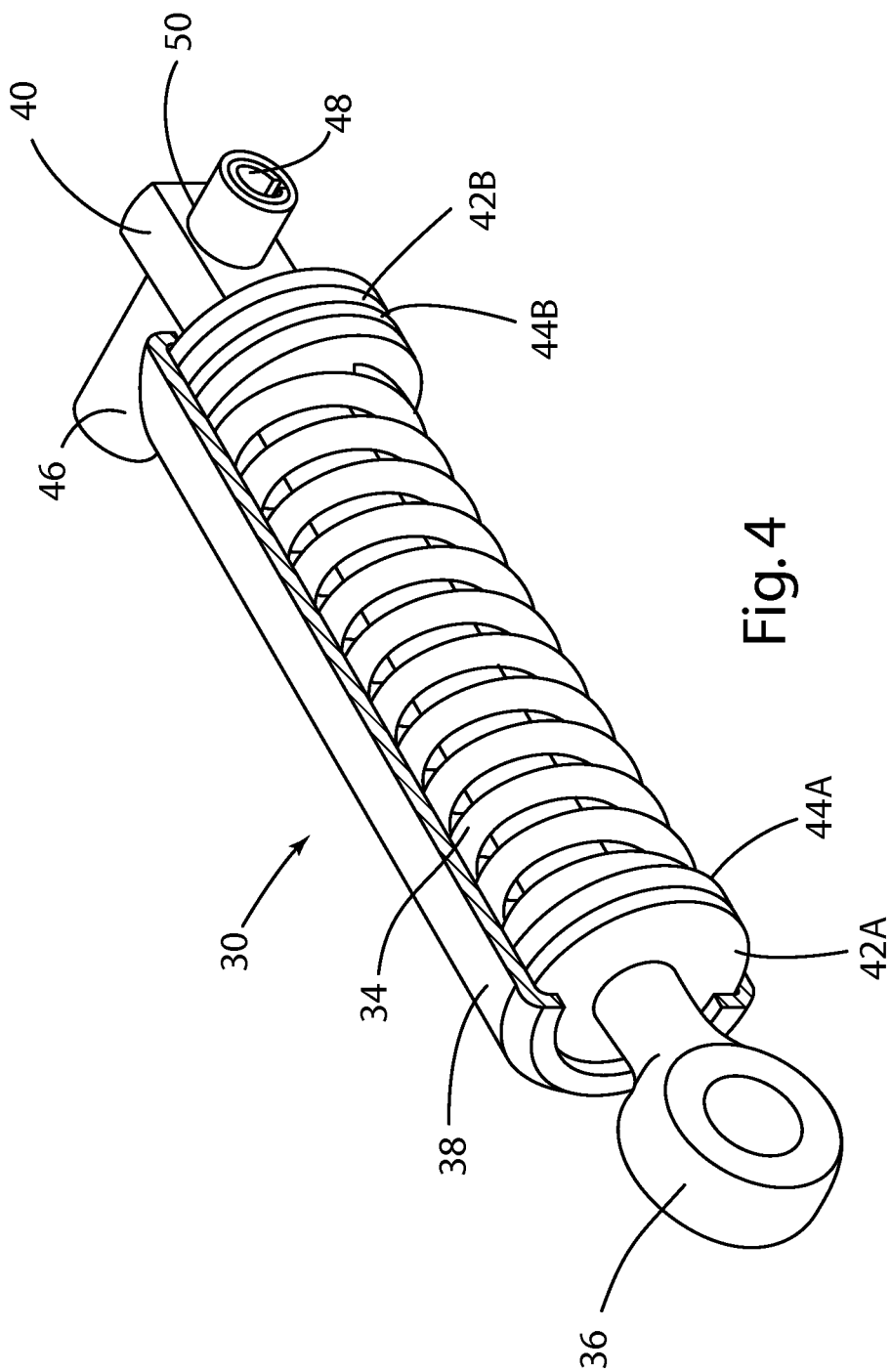
FIG. 4 is a partially fragmentary isometric view of a spring assembly according to the present invention.

A chair 1 includes a back 2, a seat 3, armrests 4 and a base 5 with castors 6. With further reference to FIGS. 2 and 4, chair 1 includes a four bar linkage comprising a base link 12 that is fixed to the chair base 5, a seat link 14, a control link 16, and a lower link 18. The links 12-16 are interconnected by first, second, third, and fourth pivots 21, 22, 23, and 24, respectively. A spring assembly 30 generates tension forces F1 and F2 acting on points 31 and 32 to thereby bias the four bar linkage 10 into an upright position as shown in FIGS. 2 and 3. It will be understood that the spring and method of the present invention is not limited to coil springs, and also is not limited to spring assemblies generating a tension force.

With further reference to FIGS. 4-6 and FIGS. 9-10 spring assembly 30 includes a coil spring 34, an actuator or rod 36 having an opening 52 at end 54, a housing or enclosure 38, and an end plug or fitting 40. The spring assembly 30 also includes washers, 42A, 42B and bushings 44A, 44B. A pin 46 extends through an opening 50 in end plug or fitting 40, and a retainer 48 retains the pin 46 in the opening 50. Retainer 48 may comprise a C clip that is received in an annular grove, or it may comprise other suitable retaining devices to retain pin 46 in opening 50 of end plug 40. With reference to FIG. 5A, in a preferred embodiment, pin 46 includes a cylindrical portion 46A having a raised ring-like protrusion or ridge 46B and a slot 46C. Retainer 48 includes an annular ridge 48A that snaps over ridge 46B such that retainer 48 is retained on pin 46. Pin 46 and/or retainer 48 may comprise steel or other suitable material.

When assembled, pin 46 and opening 52 at end 54 of rod 36 are utilized to transmit forces through the spring assembly 30. When spring assembly 30 is assembled, end flanges 56 and 58 of housing 38 retain the spring 34 in a prestressed, compressed condition. As discussed in more detail below, the flange 58 is formed during assembly while measuring a force applied to rod 36 and end plug or fitting 40, such that the spring 34 has a predefined preload. Thus, the magnitude of tension forces F1 and F2 applied to rod 36 and end plug 40, respectively, must exceed a specified preload force amount before the rod 36 and end fitting 40 will move relative to one another from the initial position shown in FIG. 5. If tension forces F1 and F2 exceed the predefined preload force, coil spring 34 will compress further, resulting in movement of rod 36 in the direction of the arrow "A" (5) relative to end plug or fitting 40. The spring assembly 30 of the present invention can be assembled in a way that ensures that the actual tension forces F1 and F2 required to cause movement of rod 36 relative to fitting 40 fall within a predefined acceptable range.

With reference to FIG. 8, housing 38 is initially formed to include an inwardly-extending flange 56A at first end 62A of housing 38. Circular edge 66 at second end 62B of housing 38 is not initially formed to include a flange. During assembly, a first washer 42A is initially positioned in the inner space 60 of housing 38 in position against flange 56A at a first end 62A of housing 38, and a first bushing 44A and rod 36 are positioned as shown in FIG. 8. Rod 36 initially includes a reduced diameter end portion 64 that receives second washer 42B. A coil spring 34 is then positioned in housing 38, and a second bushing 44B and second washer 42B are then positioned in the interior space 60 with second washer 42B disposed on reduced diameter end portion 64 of rod 36. The edge 66 of housing 38 is initially not formed to include a flange, such that washers 42A and 42B, and bushings 44A and 44B can be inserted into interior space 60 of housing 38.

End 64 of rod 36 is then deformed utilizing a known radial riveting process or other suitable process to create an enlarged end portion 65 which securely retains the washer 42B on end 68 of rod 36. Enlarged end portion 65 is shown in dashed lines in FIG. 8, and in solid lines in FIG. 9. This forms a subassembly 30A as shown in FIG. 8.

Figure 7:
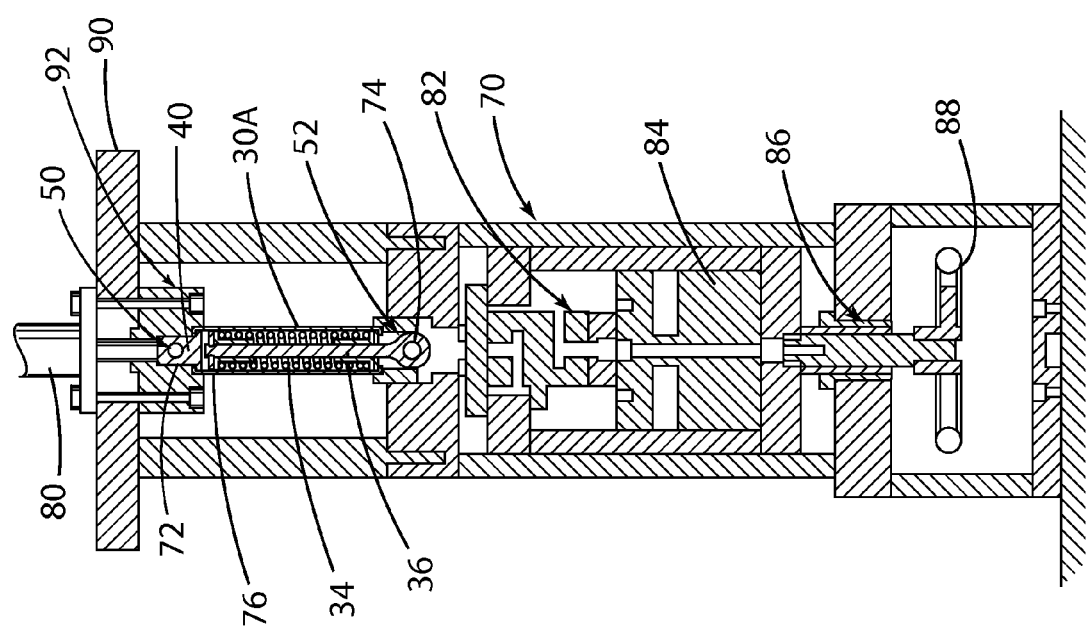
FIG. 7 is a cross-sectional view of a machine utilized to assemble the spring assembly according to the present invention.
Figure 10:
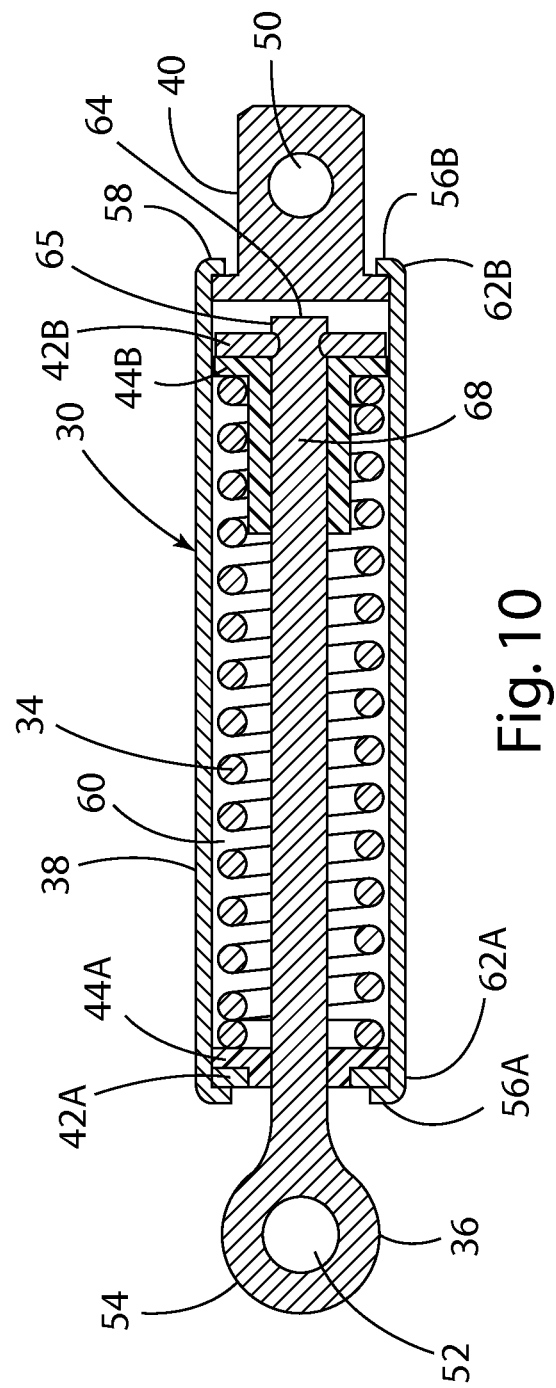
FIG. 10 is a cross-sectional view of a spring assembly according to the present invention.

Subassembly 30A is then positioned in a fixture 70 (FIG. 7). Fixture 70 includes first and second pins 72 and 74, respectively, that are received in openings 50 and 52, respectively of spring subassembly 30A. An end plug or fitting 40 is positioned in second end 62B of housing 38. Pins 72 and 74 may be inserted utilizing pneumatic or hydraulic cylinders (not shown). Upper pin 72 fixes the plug 40 relative to upper plate 90 of fixture 70, and lower pin 74 fixes the rod 36 relative to a vertically adjustable cylinder 84. Cylinder 84 can be driven upwardly by threaded force adjustment device 86 by rotating a hand wheel 88. A load cell 82 is utilized to measure the force generated by coil spring 34 on pin 74 due to upward movement of cylinder 84. Although a threaded adjustment device 86 and hand wheel 88 are shown in the fixture 70, the force adjustment device utilized to compress coil spring 34 may comprise a hydraulic cylinder, an electrically-powered actuator, or other suitable powered device.

Once a predetermined or predefined force is generated as measured by load cell 82, a forming tool 92 is shifted downwardly into position adjacent second end 62B of housing 38 utilizing a hydraulic cylinder 80 or other suitable powered actuator. The forming tool 92 then forms edge 66 (FIG. 8) into flanges 56B (FIG. 9) to retain plug 40 at a position wherein the coil spring 32 is preloaded at the desired level. This process thereby sets the preload force at a desired, predefined level or to a predefined range that includes acceptable tolerance variations. The final spring assembly 30 (FIGS. 9 and 10) is then removed from fixture 70.

Referring again to FIG. 1, chair assembly 1 includes two spring assemblies 30. Because the spring assemblies 30 are consistent with respect to the preload or initial force required to initially extend the spring assemblies 30, a plurality of chairs 1 can be manufactured and the springs 30 do not need to be adjusted at the time of assembly of the chair 1. Furthermore, each chair 1 assembled will have substantially the same tilt characteristics with respect to the amount of force required to tilt the chair back.

The invention claimed is:

1. A method of assembling a spring assembly; the method comprising:
   providing a coil spring having first and second opposite spring ends and an axis;
   providing a tube having an interior space and a first retaining structure at a first end of the tube such that the coil spring transmits force to the tube upon insertion of the coil spring into a second end of the tube;
   providing an elongated rod having first and second rod ends;
   positioning the rod in the tube with the first rod end toward the first tube end and the second rod end toward the second tube end;

positioning the spring in the tube with the first end of the coil spring engaging the first retaining structure;
providing a second retaining structure;
attaching the second retaining structure to the second end of the rod such that the second retaining structure moves with the rod, and wherein the coil spring is positioned at least partially inside the tube between the first and second retaining structures;
axially compressing the coil spring;
measuring an axial force acting on the coil spring as the coil spring is axially compressed utilizing an assembly tool having a force sensor;
followed by fixing a stop on the second end of the tube such that the stop retains the second retaining structure at a position wherein the magnitude of the measured axial force acting on the coil spring is at a predefined magnitude or is within a predefined range;
removing the spring assembly from the assembly tool whereby the force sensor of the assembly tool is no longer capable of measuring an axial force acting on the coil spring.

2. The method of claim 1, including:
placing the tube in a fixture;
placing the elongated rod in a fixture; wherein the elongated rod has an annular surface;
positioning the second retaining structure on the rod in contact with the annular surface; and
deforming a portion of the elongated rod to fix the second retaining structure on the elongated rod such that a position of the second retaining structure on the elongated rod cannot be adjusted.

3. A method of assembling a spring assembly; the method comprising:
providing a coil spring having first and second opposite spring ends and an axis;
providing a tube having an interior space and a first retaining structure at a first end of the tube such that the coil spring transmits force to the tube upon insertion of the coil spring into a second end of the tube;
providing an elongated rod having first and second rod ends;
positioning the rod in the tube with the first rod end toward the first tube end and the second rod end toward the second tube end;
positioning the spring in the tube with the first end of the coil spring engaging the first retaining structure;
providing a second retaining structure;
attaching the second retaining structure to the second end of the rod such that the second retaining structure moves with the rod, and wherein the coil spring is positioned at least partially inside the tube between the first and second retaining structures;
axially compressing the coil spring;
measuring an axial force acting on the coil spring as the coil spring is axially compressed utilizing an assembly tool having a force sensor;
followed by fixing a stop on the second end of the tube such that the stop retains the second retaining structure at a position wherein the magnitude of the measured axial force acting on the coil spring is at a predefined magnitude or is within a predefined range;
removing the spring assembly from the assembly tool whereby the force sensor of the assembly tool is no longer capable of measuring an axial force acting on the coil spring;
the tube defines an axis;
the stop comprises an integral flange that extends inwardly in a direction that is transverse to the axis of the tube, wherein the flange is formed at the second end of the tube.

4. The method of claim 3, wherein:
the annular flange is formed on the second end of the tube by bending portions of the tube after the second retaining structure is attached to the elongated rod.

5. The method of claim 4, wherein:
the tube includes an inwardly-extending flange at the first end defining the first retaining structure at the time the tube is placed in the fixture;
the rod includes a ring structure having a transverse opening therethrough at the first end of the rod; and
positioning the rod in the tube includes positioning the ring structure outside of the first end of the tube adjacent the inwardly-extending flange.

6. The method of claim 5, including:
positioning an inner portion of an end plug inside the tube before forming the annular flange, whereby an outer portion of the end plug having a transverse opening therethrough is positioned outside the tube after forming the annular flange and the inner portion bears against the annular flange.

7. The method of claim 6, wherein:
the coil spring is deformed utilizing a linear powered actuator.

8. The method of claim 6, wherein:
the second end of the tube is deformed to form the stop while the coil spring is compressed to thereby retain a portion of the end plug inside the tube.

9. The method of claim 8, wherein:
the stop comprises a flange formed by a forming tool.

* * * * *